US012589982B2

(12) United States Patent
Burgmeier et al.

(10) Patent No.: US 12,589,982 B2
(45) Date of Patent: Mar. 31, 2026

(54) ROTARY-MACHINE TYPE DEVICE FOR FILLING A FILLING MEDIUM INTO A MULTIPLICITY OF CONTAINERS

(71) Applicant: GASTI Verpackungsmaschinen GmbH, Schwaebisch Hall (DE)

(72) Inventors: Berthold Burgmeier, Dillingen (DE); Bastian Krogner, Vellberg (DE); Achim Stiegler, Crailsheim (DE)

(73) Assignee: GASTI Verpackungsmaschinen GmbH (DE)

( * ) Notice: Subject to any disclaimer, the term of this patent is extended or adjusted under 35 U.S.C. 154(b) by 0 days.

(21) Appl. No.: 18/642,990

(22) Filed: Apr. 23, 2024

(65) Prior Publication Data

US 2024/0351844 A1 Oct. 24, 2024

(30) Foreign Application Priority Data

Apr. 24, 2023 (DE) ..................... 10 2023 110 378.4

(51) Int. Cl.
*B67C 3/22* (2006.01)
*B67C 3/24* (2006.01)

(52) U.S. Cl.
CPC ................ *B67C 3/225* (2013.01); *B67C 3/24* (2013.01)

(58) Field of Classification Search
CPC ......... B65B 43/50; B65B 65/02; B65B 43/60; B67C 3/24; B67C 3/225
USPC .......................................................... 141/144
See application file for complete search history.

(56) References Cited

U.S. PATENT DOCUMENTS

| | | | | |
|---|---|---|---|---|
| 5,111,857 | A * | 5/1992 | LaWarre, Sr. | B67C 3/22 141/144 |
| 5,762,113 | A * | 6/1998 | Ricossa | B65B 1/22 141/73 |
| 6,338,371 | B1 * | 1/2002 | Araki | B65B 43/50 53/381.1 |

FOREIGN PATENT DOCUMENTS

| | | | |
|---|---|---|---|
| DE | 3024271 | C2 | 11/1983 |
| DE | 102010027337 | A1 | 1/2012 |
| DE | 102010062922 | A1 | 6/2012 |
| DE | 102013103310 | A1 | 10/2014 |
| DE | 102017215443 | A1 | 3/2019 |

OTHER PUBLICATIONS

German Patent Office; Office Action in related German Patent Application No. DE 10 2023 110 378.4 dated Jan. 23, 2024; 10 pages.

(Continued)

*Primary Examiner* — Jason K Niesz
(74) *Attorney, Agent, or Firm* — Dorton & Willis, LLP

(57) ABSTRACT

A rotary-machine type device for filling a filling medium, in particular a food, into a multiplicity of containers. The device includes a drive unit and a multiplicity of container receptacles, which are each designed for receiving a container and are rotatable about a vertical axis V by the drive unit. The drive unit has a stationary hollow shaft and, radially outside the stationary hollow shaft, a motor-driven rotor, wherein the rotor is mechanically coupled to the multiplicity of container receptacles. The drive unit has a plurality of flanges which are spaced apart in the vertical direction and protrude outwards from the drive unit in the radial direction. At least one flange is rotatable with the rotor.

13 Claims, 4 Drawing Sheets

(56) References Cited

OTHER PUBLICATIONS

European Patent Office; Extended Search Report in related European Patent Application No. 24 17 1858.4 dated Sep. 19, 2024; 7 pages.
Korean Patent Office; Office Action in related Korean Patent Application No. 10-2024-0054214 dated Oct. 22, 2025; 6 pages.

* cited by examiner

ROTARY-MACHINE TYPE DEVICE FOR FILLING A FILLING MEDIUM INTO A MULTIPLICITY OF CONTAINERS

CROSS-REFERENCE TO RELATED APPLICATIONS

This application claims the benefit of priority under 35 U.S.C. § 119(a) to German Patent Application No. DE 10 2023 110 378.4, filed Apr. 24, 2023 (pending), and is related to U.S. Application Ser. No. 18/643,010, filed Apr. 23, 2024 (pending), and U.S. Application Ser. No. 18/643,028, filed Apr. 23, 2024 (pending), the disclosures of which are incorporated by reference herein in their entirety.

TECHNICAL FIELD

The present invention relates to a device of the rotary-machine type for filling a filling medium, in particular a food, into a multiplicity of containers.

BACKGROUND

A wide variety of filling systems, with which a wide variety of different filling media or filling products can be filled into a wide variety of different packagings, are known from the prior art. For example, hot and cold, liquid, pasty and powdery filling products such as soups, beverages, dairy products and sandwich spreads, but also piece goods such as pasta, can be filled into packagings which differ in size and can be produced from different materials. Such filling systems have to have a precise metering capability, have to comply with high hygiene standards and have to ensure high consumer safety.

In the case of fully automatic filling systems, in which not only the filling process, but also the closing and transporting of the packagings takes place automatically, a distinction is made in principle between linear machines and rotary machines. In the case of linear machines, all of the process steps are carried out along a rectilinear transport path, while in the case of a rotary machine, the transport path is a circular path or else an oval path. The packagings are usually transported upright or suspended, depending on the filling product and the type and size of the packaging.

The general structure of the filling systems known from the prior art comprises a basic structure with a tabletop, under which all of the drive components are accommodated. The handling of the packaging to be filled and the individual process steps, which are carried out by what are referred to as functional units, are carried out above the tabletop. For example, individual packagings, for example cups, are first of all unloaded from a destacking unit and inserted into respective openings provided in a turntable serving as a transport unit. Depending on the filling product, the cups can then be sterilized and filled with filling product in a filling and metering unit. The filled cups are then provided with a seal and sealed. Optionally or alternatively, the filled cups can also be closed with a lid. In a subsequent process step, the cups can be printed and checked for tightness. Finally, the filled and sealed cups are lifted out of the container openings by means of a usually pneumatically driven lifting unit, which moves through the tabletop, and then leave the filling system in a discharge unit and are packaged elsewhere and placed on pallets.

When cleaning the filling systems known from the prior art, the tabletop serves as protection for the drive side, which must not be cleaned wet-chemically. At the same time, the tabletop makes it more difficult to clean the floor below the drive side. On the other hand, the individual functional units are mounted on the tabletop. Owing to the fact that any lifting units move through the tabletop and thus the process step of lifting the cups out of the cup openings is fixed locally on the tabletop, the position and often also the number of functional units is very substantially fixed. In the event that an existing filling system is intended to be re-equipped for another filling product, for which, for example, aseptic filling is necessary, the filling system would have to be converted to a considerable extent and equipped with a different tabletop, since the lifting unit may possibly not be able to remain at the same location.

SUMMARY

It is therefore an object of the present invention to minimize or even to eliminate any disadvantages known from the prior art. In particular, it is an object of the present invention to propose a structure for a rotary machine, which is easier to clean and in which the risk of contamination of the filling product to be filled is reduced.

The invention relates to a device of the rotary-machine type for filling a filling medium, in particular a food, into a multiplicity of containers. The device comprises a drive unit and a multiplicity of container receptacles, which are each designed for receiving a container and are rotatable about a vertical axis by the drive unit. The drive unit has a stationary hollow shaft and, radially outside the stationary hollow shaft, a motor-driven rotor, wherein the rotor is mechanically coupled to the multiplicity of container receptacles, and wherein the drive unit has a plurality of flanges which are spaced apart in the vertical direction, protrude outwards from the drive unit in the radial direction and of which at least one flange is rotatable with the rotor.

It is advantageous if the device further comprises a multiplicity of discrete container transport units which are rotatable about the vertical axis and each have at least one container receptacle of the multiplicity of container receptacles, and if the multiplicity of container transport units are fastened with a clamping action to the flange which is rotatable with the rotor.

Preferably, the multiplicity of container transport units extend radially from the drive unit in the radial direction.

More preferably, the multiplicity of container transport units are at least partially spaced apart from one another in the direction of rotation.

According to a preferred embodiment of the invention, each container transport unit of the multiplicity of container transport units comprises an end which faces away from the drive unit and is mounted movably on a sliding ring.

It is advantageous if the device further comprises at least one functional unit, which is selected from the group consisting of a container destacking unit, a container filling unit, a container covering unit, a container sealing unit, a container printing unit, a container inspection unit and a container discharge unit, and if the functional unit on the one hand is fastened to a stationary flange provided on the drive unit with a clamping action and on the other hand is mounted on a support ring.

It is also advantageous if the support ring is arranged in the radial direction outside the multiplicity of container receptacles.

Preferably, the support ring is in the form of a closed circular ring.

Even more preferably, the support ring is mounted on the floor by means of a multiplicity of vertical floor supports which are mounted on the floor.

It is furthermore preferred if the multiplicity of floor supports are fastened to a stationary flange, which is provided on the drive unit, with the aid of a multiplicity of horizontal cross members.

According to a preferred embodiment of the invention, the container receptacles are openings, which are designed for receiving a cup and/or a bucket and/or a bottle.

Preferably, the device is designed for filling a liquid or pasty food into a multiplicity of containers.

These and other aspects of the present invention will become apparent from the following description of exemplary embodiments of the invention.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

A device according to the principles of the present disclosure for filling a filling medium into a multiplicity of containers is suitable for filling a wide variety of filling products, for example hot, cold, liquid, pasty or also powdery filling products, such as soups, beverages, dairy products and sandwich spreads, but also piece goods, for example, pasta, into different packagings made from different materials, for example from plastic, glass, cardboard, etc. In particular, the filling device according to the invention, which is conventionally also referred to as a filling system, is suitable for filling liquid or pasty foods into a multiplicity of containers, such as cups, buckets or bottles.

The present invention is limited exclusively to filling systems of the rotary-machine type. In the case of rotary machines, the packagings pass through the individual process steps along a circular or else oval transport path, which usually encloses an angle of 270 degrees to 360 degrees.

Figure 1:
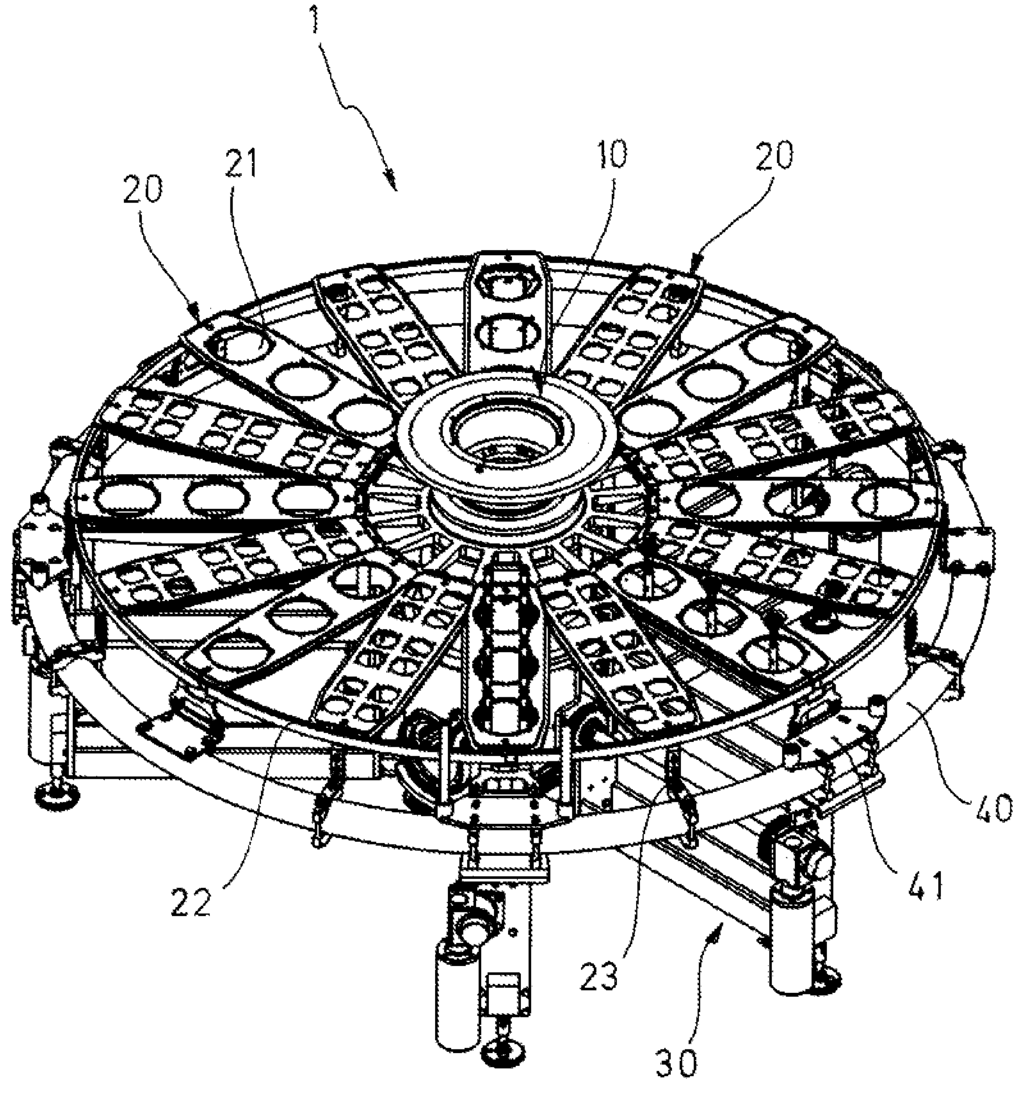
FIG. 1 shows a schematic perspective view of a filling system, not fully illustrated, in accordance with the principles of the disclosure.

The structure, illustrated in FIG. 1, of a filling device 1 according to a preferred embodiment of the invention is not complete in that, for example, functional units 50 (see FIG. 4), such as a container destacking unit, a container filling unit, a container covering unit, a container sealing unit, a container printing unit, a container inspection unit and a container discharge unit, are not illustrated in FIG. 1. Nor are any electrical and pneumatic lines and control modules necessary for the correct operation of a filling system shown in FIG. 1.

The structure shown in FIG. 1 substantially comprises a centrally arranged drive unit 10, as seen relative to the circular transport path, a multiplicity of transport units 20, a multiplicity of lifting units 30 and a support ring 40.

The transport units 20, which extend from the drive unit 10 in the radial direction and are arranged radially around the drive unit 10, have openings 21 into which the packagings to be filled, in this case cups, can be inserted. Different transport units 20 can be seen in FIG. 1. Thus, on the one hand, transport units 20 with three openings 21 and, on the other hand, transport units 20 with twelve openings 21, the diameter of which is smaller than the diameter of the transport units 20 having only three openings 21, can be seen. The transport units 20, on the one hand, are mechanically coupled or fastened to the drive unit 10, preferably via a clamping connection, which will be explained in more detail in relation to FIG. 4. On the other hand, the transport units 20 are mounted movably on a sliding ring 22. The sliding ring 22 is preferably a closed ring. If the transport units 20 are rotated by the drive unit 10 about a vertical axis V (see FIG. 3), the radially outer ends of the transport units 20 slide on the sliding ring 22. The sliding ring 22 in turn is mechanically coupled to the support ring 40. This coupling is carried out in the embodiment shown in FIG. 1 by means of a bracket 23.

Figure 2:
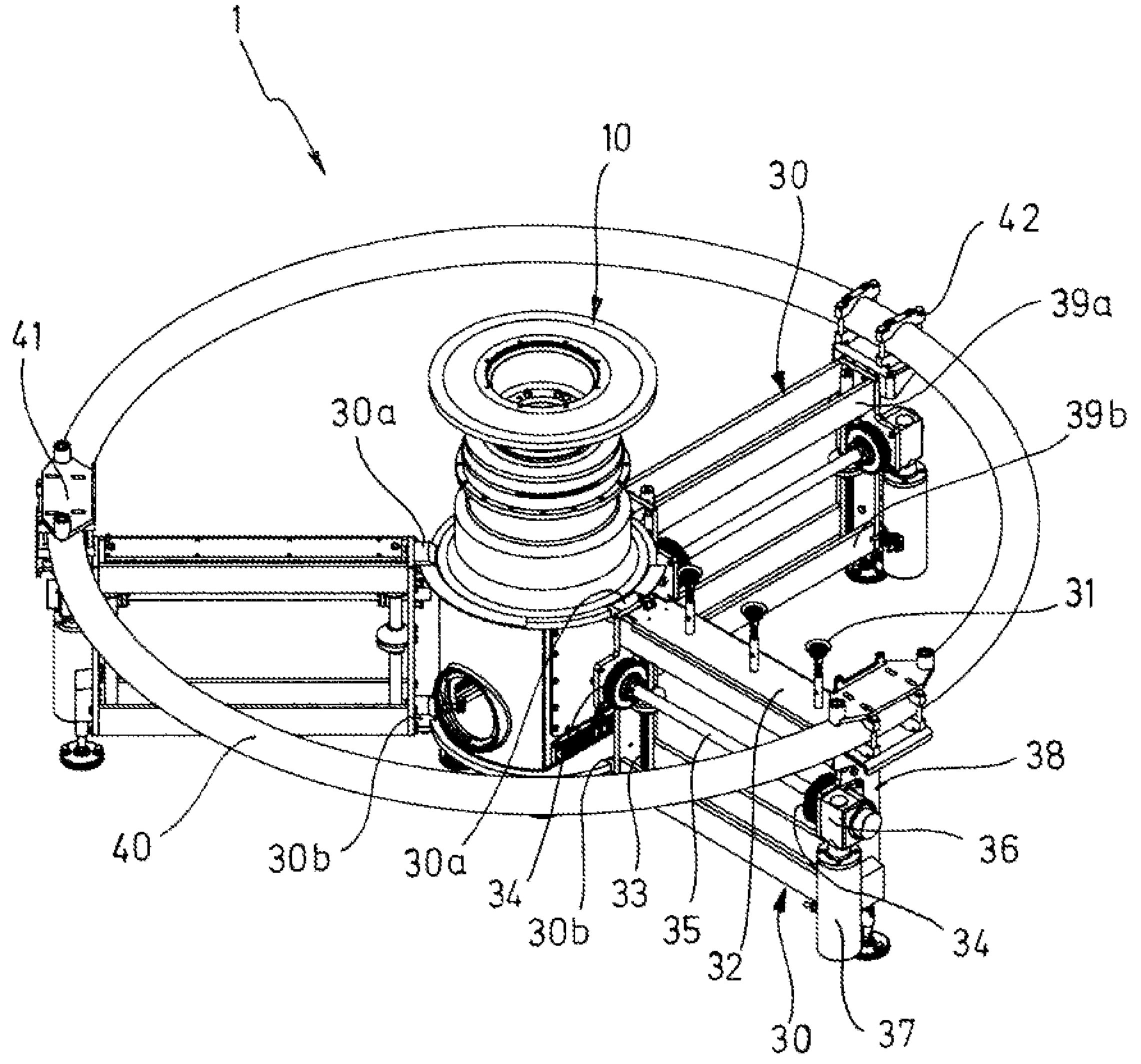
FIG. 2 shows a schematic perspective view of a basic structure of the filling system illustrated in FIG. 1.

FIG. 2 illustrates the basic structure of the filling device 1 illustrated in FIG. 1 in a schematic perspective view. The basic structure according to the invention substantially comprises the central drive unit 10, at least one lifting unit 30 and the support ring 40. In the preferred embodiment shown in FIG. 2, the basic structure comprises three lifting units 30 spaced apart from one another at an angle of 120 degrees. Each lifting unit 30 preferably comprises an upper cross member 39*a* extending in the radial direction and preferably a lower cross member 39*b* extending in the radial direction. A plate 32, from the surface of which lifting arms 31 extend in the vertical direction, is attached to the upper cross member 39*a*. The number of lifting arms 31 depends on the number of openings 21 provided in the respective transport unit 20, in order to lift a filled and sealed cup from each opening 21.

Both the upper cross member 39*a* and the lower cross member 39*b* are double-walled. The two walls are connected via side members 38 arranged on the end face. A rack 33, which in turn is connected to the upper plate 32, extends within the lower cross member 39*b* and the upper cross member 39*a*. In total, there are two racks 33 for each lifting unit 30, each of which can be moved in a vertical direction using motor-driven gearwheels 34. The gearwheels 34 are connected to one another via a shaft 35. The shaft 35 is driven by means of a motor 37 and a suitable gearbox 36. Both the motor 37 and the gearbox 36 are flanged to the side member 38 which is positioned radially on the outside and which also serves as a floor strut.

The upper cross member 39*a* and the lower cross member 39*b* are preferably fastened to the drive unit 10 with a clamping action. Thus, the upper cross member 39*a* is clamped to a flange 10*c* and the lower cross member 39*b* to a flange 10*d* of the central drive unit 10 (see FIG. 3). The clamping fastening of the upper cross member 39*a* to the flange 10*c* of the drive unit 10 is preferably carried out via a jaw clamp 30*a*, and the clamping fastening of the lower cross member 39*b* to the flange 10*d* of the central drive unit 10 is preferably carried out via a jaw clamp 30*b*. Said jaw clamps 30*a*, 30*b* merely have to be released in order to move the upper and lower cross members 39*a*, 39*b* along the flanges 10*c*, 10*d*. In other words, the releasable clamping fastening of the upper and lower cross members 39*a*, 39*b* to the flanges 10*c*, 10*d* permits a flexible arrangement of the lifting unit 30 in respect of its angular position around the drive unit 10.

The support ring 40 is likewise connected to the side member serving as a floor strut 38, specifically by means of a bracket 43, on which the support ring 40 is mounted. The support ring 40 is secured or fixed on the bracket 43 by means of a clip connection 42. Owing to the variability, the clip connection 42 can be adapted to the diameter of the support ring 40. The top side of the clip connection 42 has a plate 41 on which the bracket 23 for the sliding ring 22 can be fastened (see FIG. 3).

The support ring 40 is preferably arranged in a radial direction outside the multiplicity of container receptacles 21, and is further preferably designed as a closed circular ring.

Figure 3:
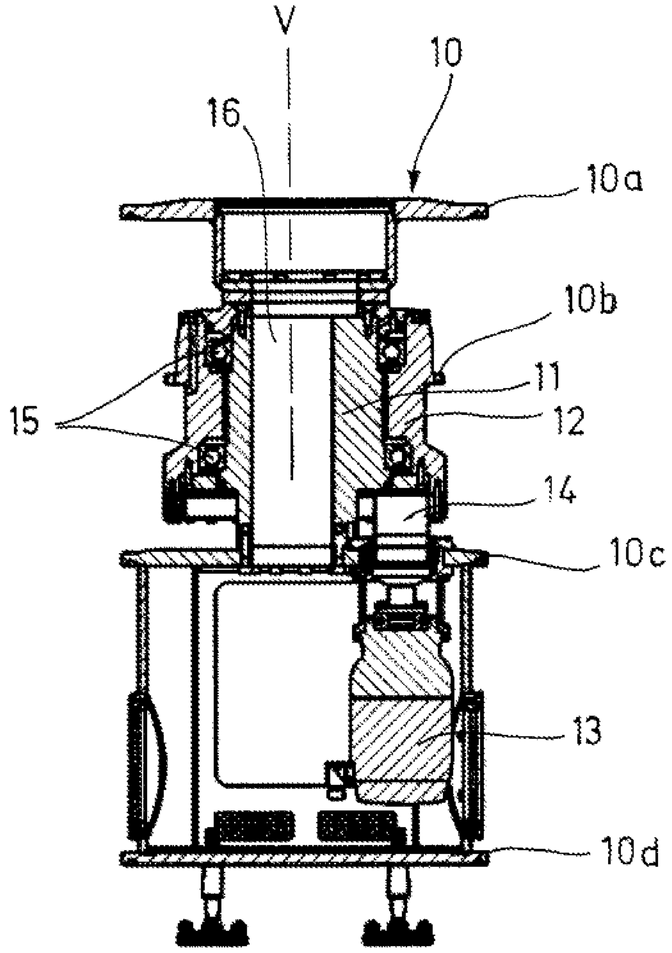
FIG. 3 shows a vertical cross-sectional view of a central drive unit.

FIG. 3 shows a vertical cross-sectional view of the central drive unit 10. The substantially cylindrical structure of the drive unit 10 comprises cylindrical sections with different diameters. A motor 13, preferably a servo motor, which drives a rotor 12 via a planetary gearing and pinion arrangement 14, is accommodated in the lowermost section, which is bounded on the bottom side by the circular flange 10*d* protruding radially outwards and is bounded on the top side by the equally circular flange 10*c* protruding outwards in the radial direction. A static hollow shaft 11, which has a through channel 16 extending in the vertical direction, is located lying radially on the inside of the rotatable rotor 12. The rotor 12 is held on bearing 15 so as to be rotatable about a vertical axis V. The rotor 12 also has a flange 10*b* which protrudes outwards in the radial direction and can rotate together with the rotor 12 about the vertical axis V. In the vertical direction above the hollow shaft 11 and the rotor 12 there is another circular flange 10*a*, which protrudes outwards in the radial direction. The through channel 16 in the region of the flange 10*a* may be open, but may also be closed if necessary with the aid of a cover, not shown in FIG. 3.

The through channel 16 located within the stationary hollow shaft 11 allows the passage of electrical and pneumatic lines to the functional units 50 fastened to the flange with a clamping action. The transport units 20, which are rotated by the drive unit 10 about the vertical axis V, are fastened to the flange 10*b*, preferably with a clamping action, by means of a jaw clamp 20*a*. As already mentioned, the upper cross member 39*a* of the lifting unit 30 is fastened to the flange 10*c*, preferably with a clamping action, while the lower cross member 39*b* of the lifting unit 30 is fastened to the flange 10*d*, preferably with a clamping action. Only the flange 10*b* rotates together with the rotor 12 about vertical axis V, while the flanges 10*a*, 10*c* and 10*d* remain stationary.

Figure 4:
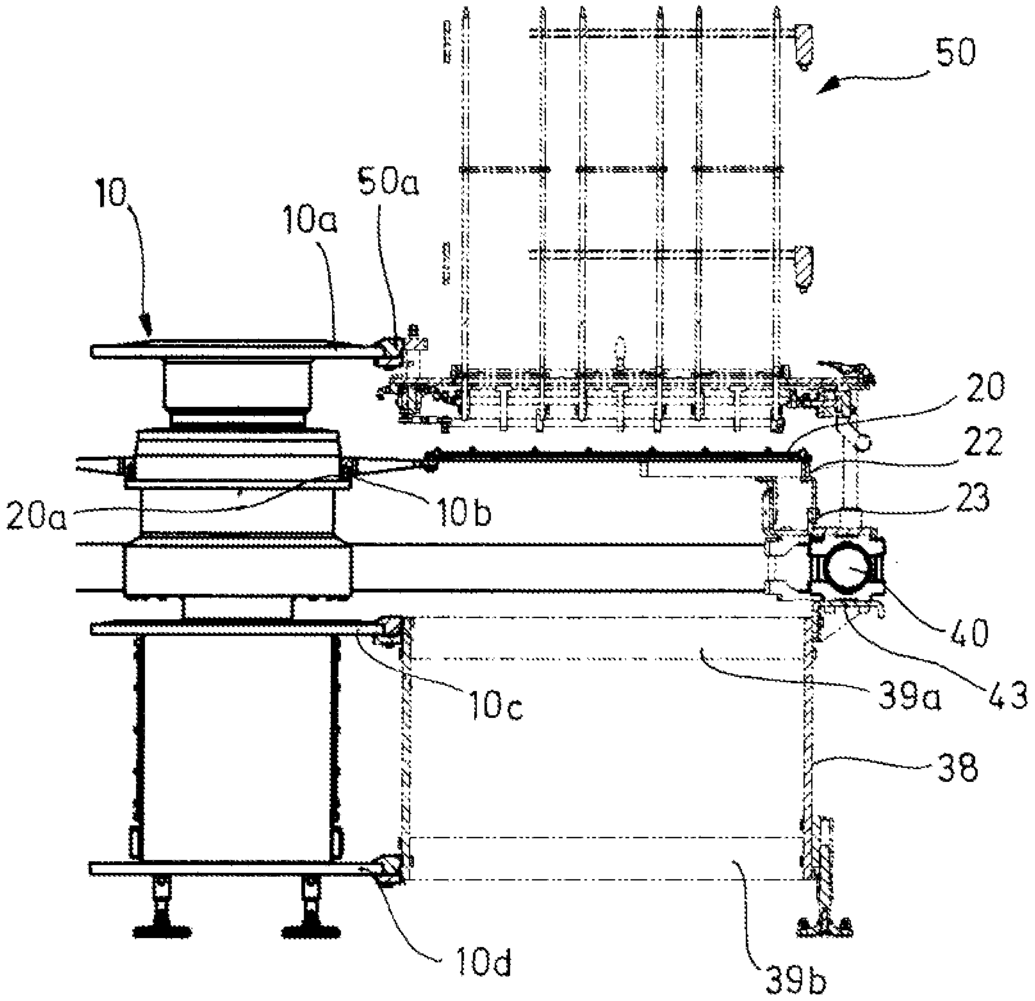
FIG. 4 shows a partially vertically sectioned view of a partial region of the filling system illustrated in FIG. 1.

FIG. 4 shows a partially vertically sectioned view of a partial region of the filling device 1 illustrated in FIG. 1. As can be seen in FIG. 4, the upper cross member 39*a* of the lifting unit 30 is fastened to the flange 10*c*, and the lower cross member 39*b* of the lifting unit 30 is fastened to the flange 10*d*, preferably with a clamping action. The two cross members 39*a*, 39*b* are connected to the floor strut (side member) 38. The floor strut 38 in turn is fastened to the support ring 40 via the bracket 43. The radially inward end of the transport units 20 is fastened to the flange 10*b*, preferably with a clamping action, while the end of the transport unit 20 facing away from the drive unit 10 rests movably on the sliding ring 22. By means of the bracket 23, the sliding ring 22 in turn is mounted on the plate 41 (FIG. 2) above the support ring 40.

A functional unit 50 is illustrated in FIG. 4 merely by broken lines. The functional unit 50 illustrated in FIG. 4 is a destacking unit in which a multiplicity of cups can be stacked along three vertical columns and can be individually unloaded into the openings 21 in the transport unit 20. This functional unit 50 in turn is fastened via a jaw terminal 50*a* to the flange 10*a* of the drive unit 10, preferably with a clamping action. As a result, all of the functional units 50 can be fastened rotationally symmetrically and completely flexibly to the drive unit 10.

Owing to the basic structure, described above, of the filling device 1, a tabletop, as it is used in the filling systems known from the prior art, is no longer necessary. The absence of a tabletop makes it easier to clean the floor below the filling system. The filling system is also modular to the extent that it can be adapted to other customer-specific requirements without a large outlay. Both the lifting unit 30 and any functional unit 50 can thus be arranged in a multiplicity of angular positions around the drive unit 10. The sequence of the individual process steps from unloading individual cups into the transport units 20 as far as a container discharge unit, not illustrated, can therefore be configured variably.

Another advantage of the modular structure of the filling device 1 according to the invention is that many parts, for example the entire basic structure shown in FIG. 2, can be used for different machine sizes, for different transport units 20 and for different filling products. This allows machines to be pre-assembled independently of the order, which in turn reduces production costs. In other words, the basic structure of the filling device 1 can be used in a very substantially standardized way for different machine sizes, different transport units and different arrangements of the functional units 50.

It is also advantageous in the case of the filling device 1 according to the invention that individual components of the filling device 1 are more easily accessible for the user with regard to servicing and maintenance work owing to the absence of a tabletop. Likewise, the operability is improved by the transport units 20 being able to be arranged at eye level of the user.

In addition, the through channel 16 provided in the stationary hollow shaft 11 allows the laying of electrical and pneumatic lines centrally through the drive unit 10, which in turn shortens the line length to the functional units 50. Since all of the electrical and pneumatic drives are accommodated in a sealed manner within the drive unit 10 and, furthermore, all of the movements and other drives are configured accessibly and cleanably, the risk of contamination, as exists in the prior art due to the vertical movement of the lifting unit 30 through the tabletop and the associated lift effects, is reduced to a minimum.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A rotary-machine type device for filling a filling medium, in particular a food, into a multiplicity of containers, the device comprising:

a drive unit;

a multiplicity of container receptacles, each container receptacle rotatable about a vertical axis by the drive unit and configured for receiving a container;

the drive unit including a stationary hollow shaft and a motor-driven rotor positioned radially outside the stationary hollow shaft;

the rotor mechanically coupled to the multiplicity of container receptacles;

the drive unit including a plurality of flanges protruding outwardly from the drive unit in a radial direction, the flanges spaced apart in a vertical direction;

wherein at least one flange is rotatable with the rotor; and a multiplicity of discrete container transport units which are rotatable about the vertical axis, each transport unit including at least one container receptacle of the multiplicity of container receptacles;

wherein the multiplicity of container transport units are fastened with a clamping action to the flange which is rotatable with the rotor.

2. The device of claim 1, wherein the multiplicity of container transport units extend radially from the drive unit.

3. The device of claim 1, wherein the multiplicity of container transport units are at least partially spaced apart from one another in a direction of rotation.

4. The device of claim 1, wherein each container transport unit comprises an end that faces away from the drive unit and is movably mounted on a sliding ring.

5. The device of claim 1, wherein the container receptacles are openings configured for receiving at least one of a cup, a bucket, or a bottle.

6. The device of claim 1, wherein the device is configured for filling a liquid or pasty food into a multiplicity of containers.

7. A rotary-machine type device for filling a filling medium, in particular a food, into a multiplicity of containers, the device comprising:

a drive unit;

a multiplicity of container receptacles, each container receptacle rotatable about a vertical axis by the drive unit and configured for receiving a container;

the drive unit including a stationary hollow shaft and a motor-driven rotor positioned radially outside the stationary hollow shaft;

the rotor mechanically coupled to the multiplicity of container receptacles;

the drive unit including a plurality of flanges protruding outwardly from the drive unit in a radial direction, the flanges spaced apart in a vertical direction;

wherein at least one flange is rotatable with the rotor; and at least one functional unit selected from the group consisting of a container de-stacking unit, a container filling unit, a container covering unit, a container sealing unit, a container printing unit, a container inspection unit, and a container discharge unit;

wherein the functional unit is fastened with a clamping action on one side to a stationary flange of the plurality of flanges, and is mounted on the other side on a support ring.

8. The device of claim 7, wherein the support ring is arranged in the radial direction outside the multiplicity of container receptacles.

9. The device of claim 7, wherein the support ring is in the form of a closed circular ring.

10. The device of claim 7, wherein the container receptacles are openings configured for receiving at least one of a cup, a bucket, or a bottle.

11. The device of claim 7, wherein the device is configured for filling a liquid or pasty food into a multiplicity of containers.

12. The device of claim 7, wherein the support ring is mounted on a floor by a multiplicity of vertical floor supports which are mounted on the floor.

13. The device of claim 12, wherein the multiplicity of floor supports are fastened to a stationary flange of the plurality of flanges with the aid of a multiplicity of horizontal cross members.

* * * * *